US006623575B2

(12) United States Patent
Branca

(10) Patent No.: US 6,623,575 B2
(45) Date of Patent: Sep. 23, 2003

(54) METHOD FOR PRODUCING A MANUFACTURED ITEM AT LEAST PARTLY IN RECYCLED MATERIAL, AND THE MANUFACTURED ITEM SO OBTAINED

(75) Inventor: Alfonso Branca, Milan (IT)

(73) Assignee: Top Glass S.p.A., Pioltello (IT)

( * ) Notice: Subject to any disclaimer, the term of this patent is extended or adjusted under 35 U.S.C. 154(b) by 76 days.

(21) Appl. No.: 09/737,315

(22) Filed: Dec. 14, 2000

(65) Prior Publication Data

US 2001/0003858 A1 Jun. 21, 2001

(30) Foreign Application Priority Data

Dec. 15, 1999 (EP) .............................. 99830779
Jul. 17, 2000 (EP) .............................. 00115409

(51) Int. Cl.[7] .............................................. B32B 31/00
(52) U.S. Cl. ......................... 156/62.2; 156/64; 156/93; 156/290; 156/308.4
(58) Field of Search ............................. 156/62.2, 62.4, 156/62.6, 64, 73.1, 91, 92, 93, 290, 308.2, 308.4

(56) References Cited

U.S. PATENT DOCUMENTS

| 3,614,936 A | | 10/1971 | Philipps | |
| 3,684,645 A | | 8/1972 | Temple | |
| 5,169,571 A | * | 12/1992 | Buckley | 264/22 |
| 5,665,185 A | * | 9/1997 | Meeker | 156/62.2 |
| 5,743,985 A | * | 4/1998 | Ernest et al. | 156/342 |
| 5,759,927 A | * | 6/1998 | Meeker | 442/334 |
| 6,156,682 A | * | 12/2000 | Fletemeir et al. | 442/394 |

FOREIGN PATENT DOCUMENTS

| EP | 0 333 602 A1 | 2/1989 |
| WO | WO 98/53978 | 5/1998 |

* cited by examiner

Primary Examiner—James Sells
(74) Attorney, Agent, or Firm—Pearne & Gordon LLP

(57) ABSTRACT

A process for producing a manufactured item of a material at least partly recycled comprises the following steps: setting a primary continuous layer (2a); setting a filling material (3); associating a predetermined amount of filling material (3) with the primary continuous layer (2a); mechanically linking the filling material (3) to the primary continuous layer (2a) to define the manufactured item. The step of associating the filling material (3) with the primary continuous layer (2a) comprises at least one sub-step of positioning the filling material (3) according to a predetermined geometric arrangement on the primary continuous layer (2a)

28 Claims, 5 Drawing Sheets

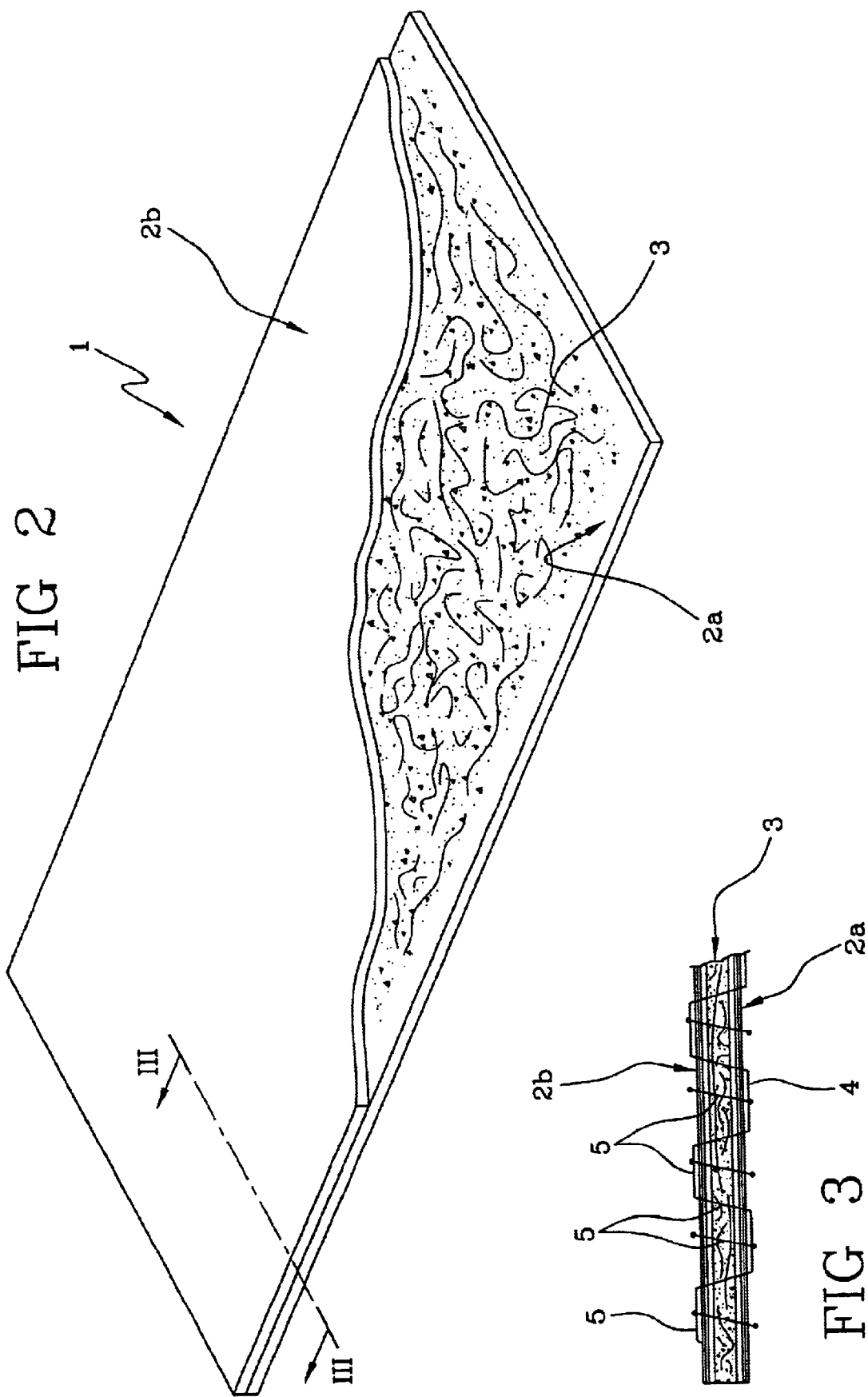

METHOD FOR PRODUCING A MANUFACTURED ITEM AT LEAST PARTLY IN RECYCLED MATERIAL, AND THE MANUFACTURED ITEM SO OBTAINED

FIELD AND BACKGROUND OF THE INVENTION

The present invention relates to a process for producing a manufactured item of an at least partly recycled material, as well as to the manufactured item obtained thereby.

It is known that due to the necessity to reduce the environmental impact and to conveniently re-use materials resulting from recovery operations of cast-off items, a great boost has been given to development of the so-called "recycling industry".

In this field, an important work portion is represented by treatment of plastic materials, taking into account their particular chemical composition and the consequent harmful effects that these materials can cause if dispersed in the surrounding environment. In particular, of all the different species of materials obtained from chemical synthesis processes, the so-called composite materials are of particular importance from an environmental and economical point of view.

It is known that production of manufactured items of composite materials is based on the presence in the manufactured item itself of a matrix typically of plastic material in which a mechanically resistant structure is buried which is formed of fibres of material having good mechanical features; these fibres have varying length, orientation and related arrangement depending on the desired application; as mentioned, fibres are inserted in a portion of the binding material mainly of polymeric nature, provided with poor mechanical properties. Obviously, the different planning specifications of the manufactured articles and the necessity to keep the production costs within given limits lead to a great variety of choice as regards both the resistant fibres and the type of structure that these fibres will define as well as finally as regards adoption of the appropriate binding material. In particular, the industrially most used polymeric binding materials can be gathered into two families: thermoplastic resins and thermosetting resins. It is known that thermoplastic resins have a chemical structure enabling the same to melt for an indefinite number of times, whereas thermosetting resins, once polymerized, if they are exposed to high temperatures again, loose their features in an irreversible manner.

In addition to the physico-chemical features of the two families of plastic materials briefly described above, it should be considered the fact that during recycling of the manufactured items made of composite materials, the binding materials of a thermoplastic type have less recovery problems than those of a thermosetting type; on the contrary, for the composite materials having thermosetting binding agents the resin cannot be easily recovered.

In order to obviate the above drawbacks, recycling of manufactured items of a composite material of the thermosetting type is typically made possible by mechanical destruction or crushing of the manufactured item itself, so as to obtain a heterogeneous material made up of broken fibres, portions of fibres forming resin clots and resin granules. Depending on engineering requirements, crushed thermosetting materials of different particle sizes can be obtained.

If recycling of the material thus obtained is wished to be carried out, the material can be used in the different production steps of other composite manufactured items where particular and definite mechanical features are not required. In more detail, if it is necessary to make manufactured articles of composite material, the solution of mixing this recycled material with the fresh binding resin was adopted in the past, so as to help in volume creation while cutting down use of integral and complete resistant fibres and/or fresh binding resin, thereby reaching a great reduction in costs.

Practically the material intended for recycling and coming from a crushing operation is homogeneously distributed within the fresh resin and it too helps in defining the composite material structure, although in a low percentage.

Although they are widely used, the production processes in accordance with the known art briefly described above have some drawbacks.

In fact, due to the particular nature of the thermosetting resin and the intrinsic heterogeneity of the crushed material, the modalities according to which this material is distributed over the different regions of the manufactured item cannot be defined and managed in an accurate manner, above all in connection with a working process for creation of this manufactured item; in particular, in the presently existing production systems there is a tendency to distribute the material to be recycled in a substantially homogeneous manner over the whole manufactured item so that this recycling material affects all the regions of the manufactured item in the same way. Arrangement of the fibres and of all the material resulting from crushing is typically irregular and random so that it is not possible to establish whether the added material to be recycled brings important benefits in terms of increase of the structural capacities of the manufactured item.

These problems are particularly stressed in the construction of manufactured items made of glass fibre in which thermosetting binding agents are generally adopted and for which during the production cycle a step is made necessary in which the glass fibres are chemically treated to ensure adhesion between the fibres themselves and the binding agent.

It is apparent that all fibres for recycling do not possess the same features so that adhesion between the same and the binding agent cannot be ensured always in the same manner; in addition, during addition of said fibres to the new manufactured item they cannot be treated again; this leads to a further factor of impossible definition of the properties of the manufactured item made up of recycled material, because the linking stability between the binding agent and the fibres resulting from crushing is unknown.

OBJECTS

Under this situation the technical task underlying the present invention is to conceive a manufactured item of a material at least partly recycled (and a production process to make the same) capable of substantially obviating the mentioned limits.

In particular, the technical task underlying the present invention is to conceive a process for producing a manufactured item of an at least partly recycled material capable of ensuring a real stability in coupling between the binding resin, the resistant fibres and the recycled material, so as to combine the advantageous use of low-cost materials with the substantial determination of the mechanical properties of the new manufactured item.

Another important aim of the present invention is to find a process ensuring a distribution of the recycled material over predetermined regions and according to substantially pre-established arrangements within the new manufactured item.

A further aim of the present invention is to devise a methodology ensuring use of the recycled material in a manner adapted to exploit the mechanical properties of the recycled fibre lengths to some extent.

Within the scope of said technical task it is also an important aim of the invention to devise a process for producing a manufactured article of a material at least partly recycled which can be very easily adapted to any type of volume to be filled, so as to have the greatest operating flexibility.

In addition, a further aim of the present invention is to devise a production process enabling an extensive use of materials from recycling operations, which will bring about advantages in terms of reduction of the environmental impact and re-use of poorly bio-degradable material A still further aim of the present invention is to devise a process of simple implementation, as well as a manufactured item capable of being handled and/or used without requiring particularly skilled manpower, which will be advantageous as regards facility of use and reduction in costs.

Another aim of the invention is to devise a process and a manufactured item having low manufacturing and installation costs.

SUMMARY OF THE INVENTION

The technical task mentioned and the aims specified are substantially achieved by a process for producing a manufactured item of an at least partly recycled material, comprising the following steps: setting a primary continuous layer (2a); setting a filling material (3); wherein said process also comprises at least the further steps of associating a predetermined amount of filling material (3) with said primary continuous layer (2a); and mechanically linking the filling material (3) to the primary continuous layer (2a) to define the manufactured item (1).

BRIEF DESCRIPTION OF THE DRAWINGS

Description of a preferred but not exclusive embodiment of a process for producing a manufactured item of an at least partly recycled material in accordance with the invention is now given hereinafter, by way of non-limiting example, with the aid of the accompanying drawings, in which:

FIG. 2 is a perspective view of a manufactured item obtained by the process of the present invention;

FIG. 3 is a sectional view of the manufactured item taken along line III—III in FIG. 2;

DESCRIPTION OF THE PREFERRED EMBODIMENT

Figure 1:
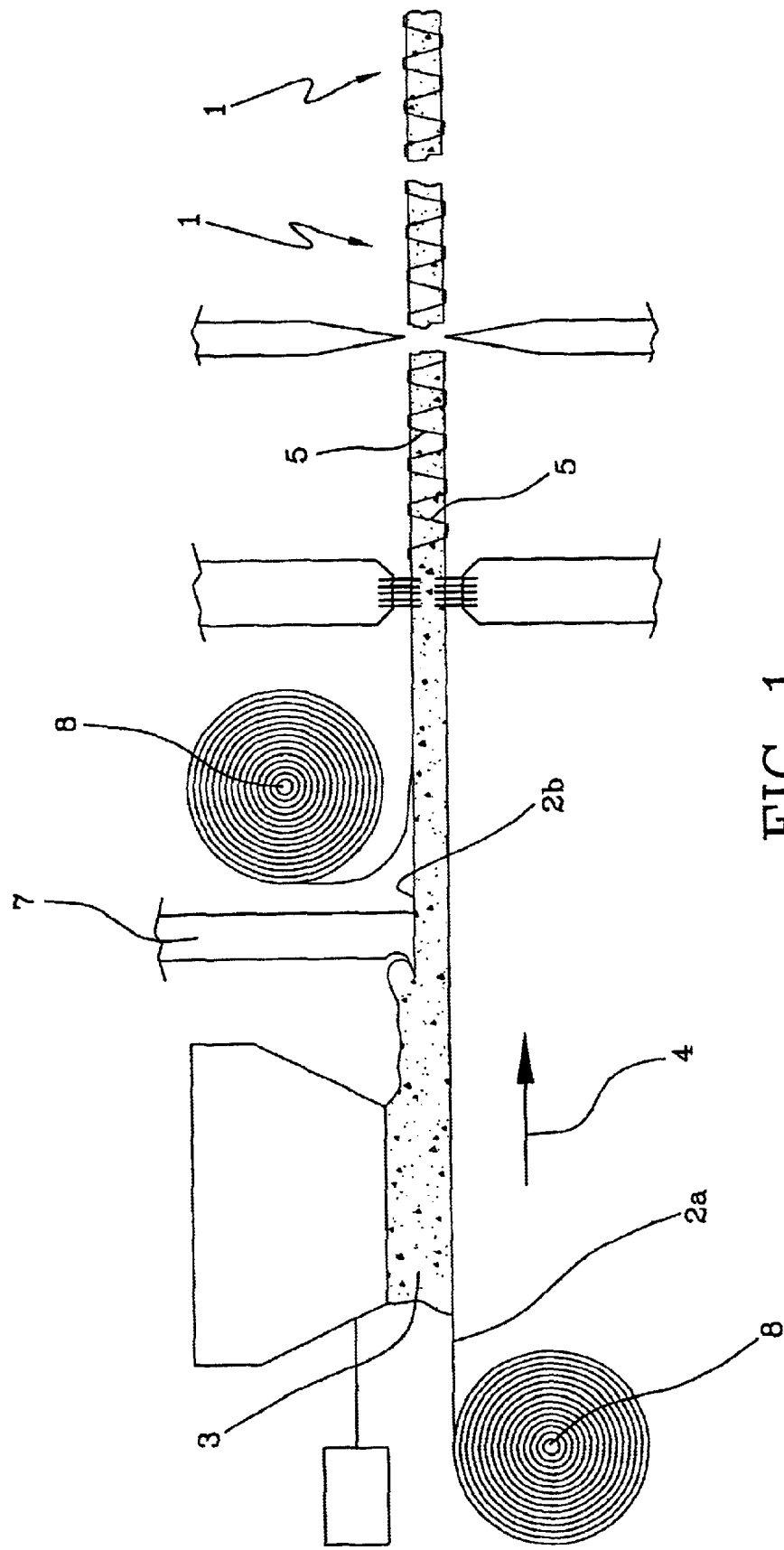
FIG. 1 is a diagrammatic view of a plant putting into practice the process of the present invention.

With reference to the drawings, the manufactured item obtained with the process of the invention has been generally identified by reference numeral 1.

In accordance with the process of the invention, first arrangement of a primary continuous layer 2a and arrangement of a filling material 3 to be associated with the primary continuous layer 2a is provided.

From a structural point of view, the primary continuous layer 2a may have a wide variety of possible embodiments, depending on the required functional qualities; for instance, the primary continuous layer 2a can be made of reinforcing fibres (glass fibres and/or aramidic fibres and/or carbon fibres and/or other fibres), or it may comprise a plurality of yarns oriented in a parallel direction, a felt of nonwoven fabric (of polyester or cellulose, for example) or a true fabric; the continuous layer may also comprise any combination of fabric and/or felt and/or parallel yarns.

Advantageously, the primary continuous layer 2a can be made of a sheet element of polymeric material which in turn can be a thermoplastic or thermosetting material; in other words, the primary continuous layer 2a can be a very thin film of plastic material; in this case, the primary continuous layer 2a only acts as a receptacle for the filling material 3, but it does not show important mechanical features (except for the minimum structural cohesion required for its movement during the production process). The filling material 3 is on the contrary obtained from previous crushing operations carried out on the manufactured items made of composite material to be recycled, preferably of a thermosetting type, which operations in turn involve at least one grinding step. At the end of these operations the obtained filling material is in the form of different corpuscles or particles: resin and/or fibre powder, agglomerates of broken fibres and resin, lengths of isolated fibres and heterogenous resin clots.

After having conveniently arranged the primary continuous layer 2a and the filling material 3, the filling material 3 is required to be associated with the primary continuous layer 2a itself; this operation can be performed following different modalities such as for instance by drop of the filling material 3 from a hopper onto the primary continuous layer 2a set in motion by a conveyor belt (or other conventional devices such as rollers and the like) along a first operating direction 4. In other words, the step of setting the primary continuous layer 2a takes place by causing the primary continuous layer 2a to move forward along this first operating direction 4; during this forward movement, all working operations are carried out until the manufactured item 1 is obtained.

It is apparent that, irrespective of how it is made, the primary continuous layer 2a must offer such an interface surface with the filling material 3 that said material is unable to pass therethrough. For the purpose the primary continuous layer 2a generally defines a continuous or netlike structure the mesh sizes of which are capable of preventing the filling material 2 from passing therethrough.

A further step of the process (which can be subsequent to or simultaneous with the step of laying down the filling material 3) involves the operation of mechanically linking the filling material 3 to the primary continuous layer 2a. This step can be typically obtained, by means of seaming lines 5 steadily engaging the different particle types characterizing the filling material 3 with the primary continuous layer 2a. Obviously, the production process in accordance with the invention may provide for use of different systems of mechanical linking, such as by means of thread lengths, rope lengths, or glueing.

By mechanically linking the filling material 3 to the primary continuous layer 2a, the manufactured item 1 generally shown in the drawings is essentially defined.

Advantageously, in the process of the present invention the step of associating the filling material 3 with the primary continuous layer 2a involves a sub-step of positioning the filling material 3 according to a predetermined geometric arrangement on the primary continuous layer 2a; obviously, selection of the particular geometric arrangement according to which the filling material 3 will be laid down on the primary continuous layer 2a is done each time, depending on the deformability and/or swelling or blowing features desired for the manufactured item 1.

In more detail, positioning of the filling material 3 can be obtained for instance by deposition of the filling material 3 on part or even all of the surface of the primary continuous layer 2a.

Figure 4:
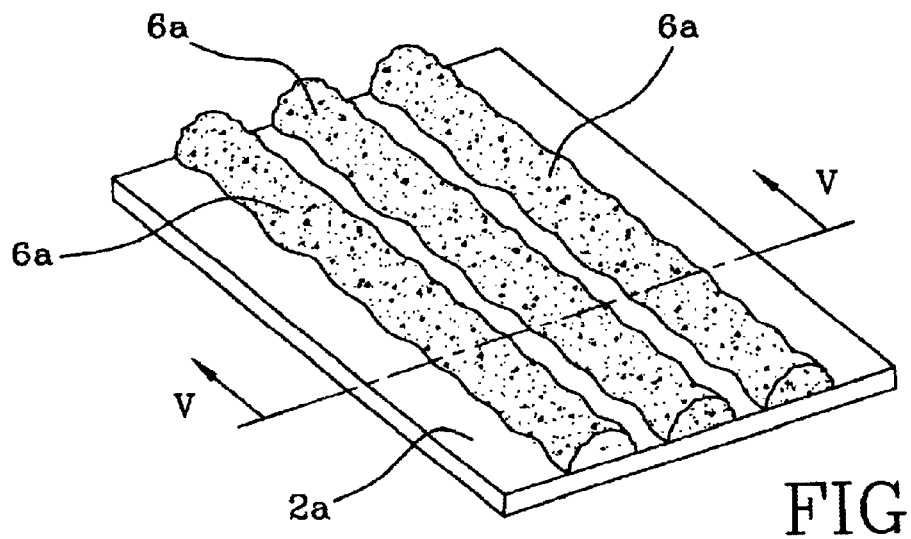
FIG. 4 is a perspective view of an alternative embodiment of the manufactured item obtainable by the process of the present invention.
Figure 5:
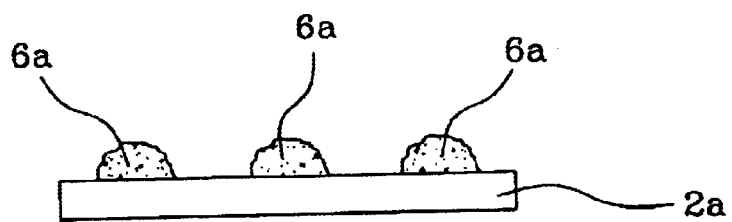
FIG. 5 is a sectional view of the manufactured item taken along line V—V in FIG. 4.
Figure 6:
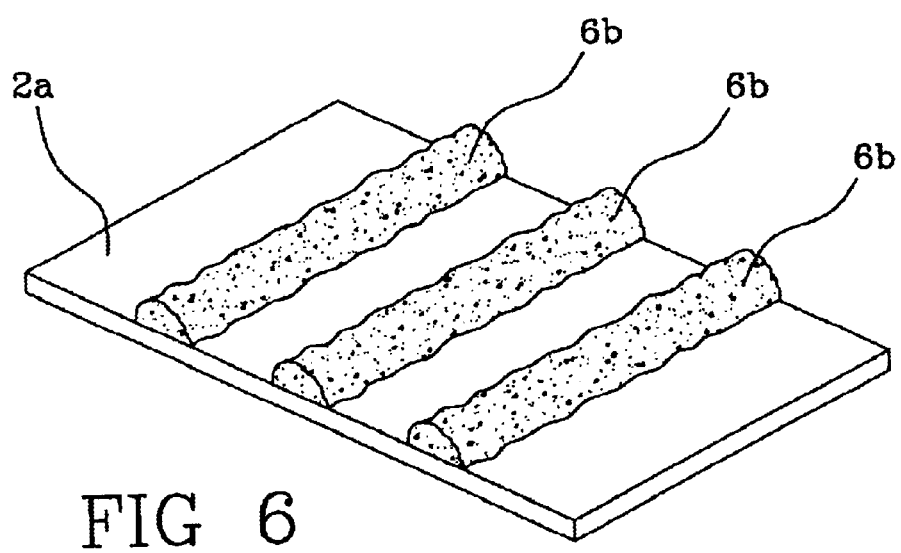
FIG. 6 is a perspective view of another alternative embodiment of the manufactured item obtainable by the process of the present invention.
Figure 7:
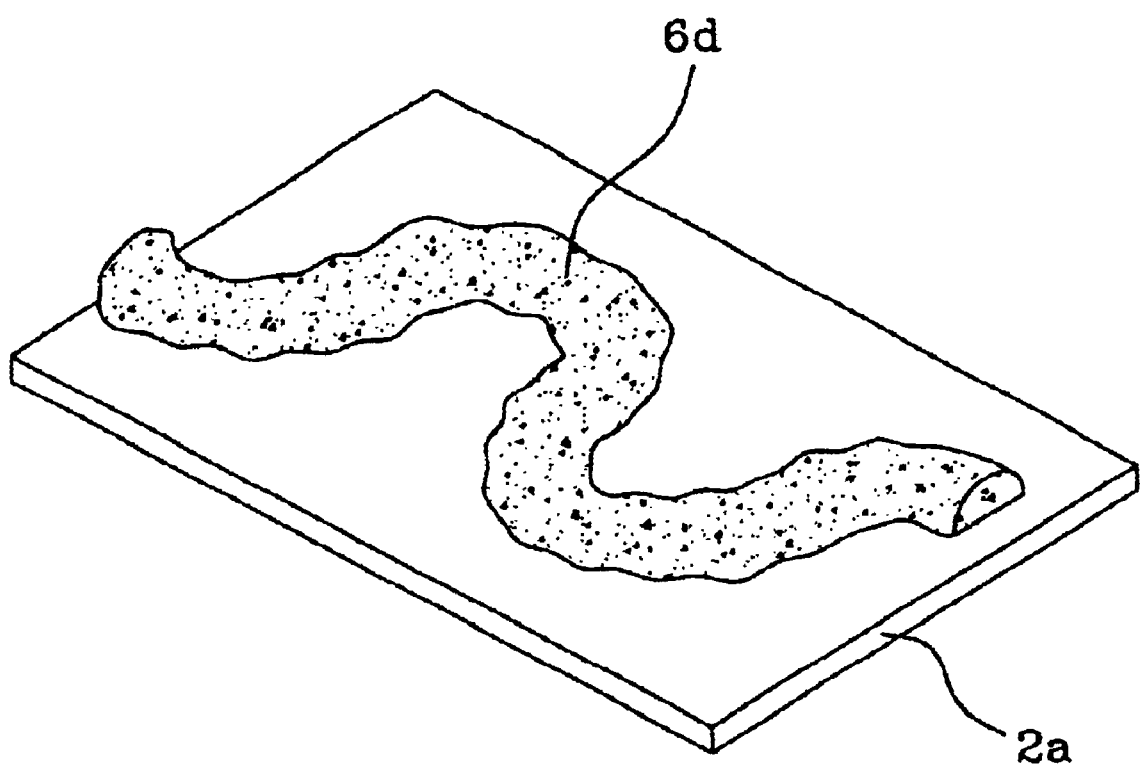
FIG. 7 is a perspective view of another alternative embodiment of the manufactured item obtainable by the process of the present invention.
Figure 8:
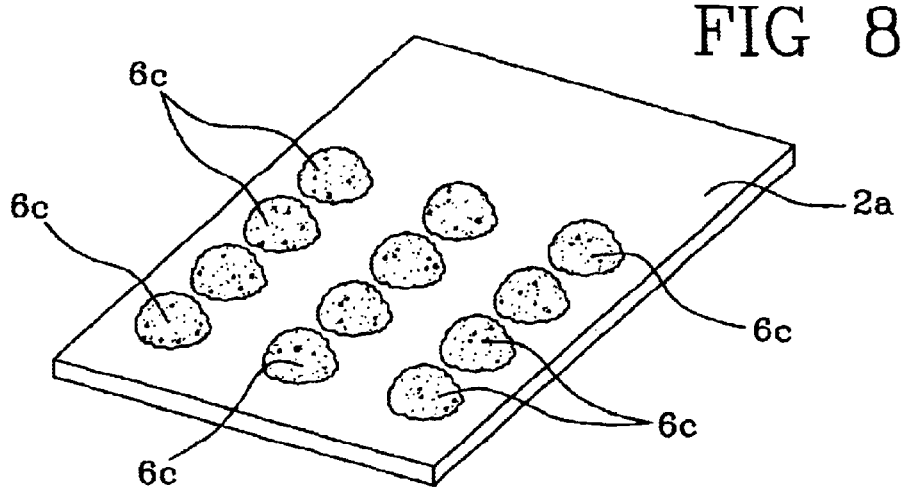
FIG. 8 is a perspective view of another alternative embodiment of the manufactured item obtainable by the process of the present invention.

Alternatively, the filling material 3 can be laid down in a predetermined number of longitudinal filling lines 6a (that can be continuous or broken, as viewed from FIG. 4) substantially parallel to the first operating direction 4; preferably, these longitudinal filling lines 6a are spaced apart the same distance from each other, for easy accomplishment and in order to ensure some structural regularity to the manufactured item 1.

In accordance with the present invention, deposition of the filling material 3 can be also obtained in a predetermined number of transverse filling lines 6b (which may be continuous or broken as well), substantially oriented transversely (and preferably perpendicularly) of the first operating direction 4; in this case too, for the same reasons described above, these transverse filling lines 6b can be spaced apart the same distance from each other.

It is also possible to pour the filling material 3 onto the primary continuous layer 2a according to a predetermined arrangement of discrete filling areas 6c, in the form of cones or spherical portions for example, or generally having any polyhedric shape and disposed in an arbitrary pattern relative to each other.

A further alternative embodiment of the filling material positioning can be obtained in accordance with predetermined filling routes 6d; these filling routes 6d can follow any trajectory, and generally comprise a plurality of curved portions (but they may also consist of broken lines).

Advantageously, the production process of the invention is such conceived that the sub-step of positioning the filling material 3 can be accomplished through a predetermined combination of longitudinal filling lines 6a and/or transverse filling lines 6b and/or discrete filling areas 6c and/or filling routes 6d, so as to ensure maximum adaptability of the manufactured item 1 to the most varied use conditions.

Advantageously, the process of the present invention also involves a step of adjusting a deposition height of the filling material 3 associated with the primary continuous layer 2a; this operation can be obtained by control of the feeding speed of the primary continuous layer 2a along the first operating direction 4 (so that the filling material falling thereon will have more or less time for accumulating); alternatively, adjustment of the deposition height is obtained by control of the dropping speed and/or flow rate of the filling material 3 on the primary continuous layer 2a, or by interaction of a height-adjusting member 7 (in the form of a horizontal partition placed to a given height from the primary continuous layer 2a running under it). In the last-mentioned case, the height-adjusting member 7 is operatively active on the filling material laid down on the primary continuous layer 2a to cause a maximum thickness of same and in particular to remove the excess filling material 3 accumulating on the primary continuous layer 2a during transportation (which is therefore moved away).

Conveniently, this step of adjusting the deposition height of the filling material 3 takes place simultaneously with the step of associating the filling material 3 with the primary continuous layer 2a, so as to streamline the production process.

Conveniently, the manufactured item 1 can be made in different structural typologies: for instance, a particularly advantageous embodiment involves the presence of a suitably-arranged secondary continuous layer 2b (disposed close to the primary continuous layer 2a, for example, and along to the first operating direction 4).

The secondary continuous layer 2b is put close to the primary continuous layer 2a in such a manner that the filling material 3 is (at least partly) included between the two continuous layers 2a and 2b, so as to create a "sandwich" structure wherein the filling material 3 is confined in the gap defined by the two mutually-facing continuous layers 2a and 2b.

In the same manner as described with reference to the primary continuous layer 2a, the secondary continuous layer 2b can be embodied either by a sheet element of polymeric preferably thermoplastic material, or a fabric, a non-woven fabric, a paper structure or a plurality of yarns disposed in parallel side by side relationship. In particular, the secondary continuous layer 2b can be made of a multiplicity of reinforcing fibres, typically glass fibres and/or aramidic and/or carbon fibres or the like, organized in a fabric, a non-woven fabric, a paper structure or a plurality of yarns disposed in parallel side by side relationship.

Conveniently, the step of setting the secondary continuous layer 2b comes after the step of associating the filling material 3 with the primary continuous layer 2a, clearly for the purpose of enabling correct deposition of the filling material itself; in this connection at should be recognized that, for the same reason as described above, the step of setting the secondary continuous layer 2b (that obviously follows the step of arranging the primary continuous layer 2a) is carried out after the step of adjusting the deposition height of the filling material 3.

On the other hand it should be noted that arrangement of the secondary continuous layer 2b takes place exactly in the same manner as described with reference to the primary continuous layer 2a; in particular, arrangement of the primary continuous layer 2a and/or the secondary continuous layer 2b is carried out by unrolling a source roll 8 along the first operating direction 4 (obviously, for each continuous layer a separate roll is to be unrolled). These source rolls 8 essentially comprise a rolled-up sheet element, that obviously can be made of any combination of features as already described with reference to the continuous layers 2a and 2b.

At this point in the process of the invention there is the step of mechanically linking the primary A continuous layer 2a and the secondary continuous layer 2b to the filling material 3 (which is interposed between the two continuous layers).

In this connection, the continuous layers 2a and 2b can be in turn mutually engaged by means of one or more series of seaming lines 5 for example, or other similar means such as thread lengths, localized pressure on the opposed layers, rope lengths, or glueing.

Figure 9:
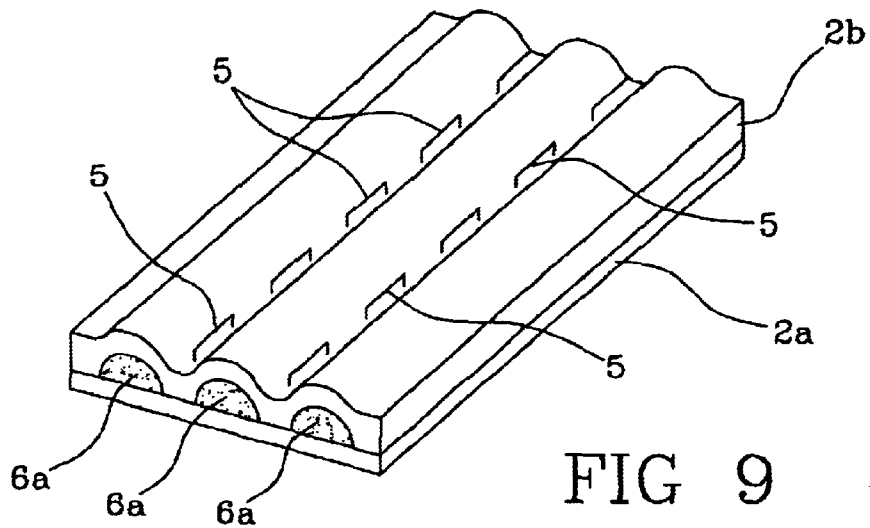
FIG. 9 is a perspective view of still another alternative embodiment of the manufactured item obtainable by the process of the present invention.
Figure 10:
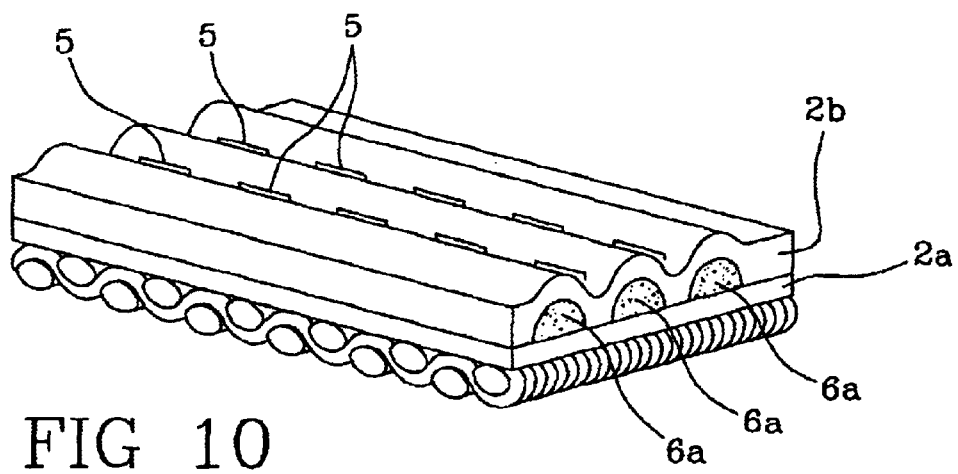
FIG. 10 is a perspective view of a further alternative embodiment of the manufactured item obtainable by the process of the present invention.

Advantageously, if the continuous layers 2a and 2b are made of sheets of thermoplastic polymeric material, they can be linked to each other (and simultaneously confining of the filling material 3 can be carried out) by heat-sealing; heat-sealing can be obtained by pressing the manufactured item on opposite sides between two heating elements, so that the two plastic films are fused together and consequently a closed volume within which the material 3 is held is formed. Obviously, it is, possible to suitably shape the heating elements; for instance, they can be such shaped that approaching of said heating elements to the manufactured item 1 helps in defining the longitudinal filling lines 6a and/or the transverse filling lines 6b and/or the discrete filling areas 6c and/or the filling routes 6d (see FIGS. 9 and 10); in this connection, it should be also recognized that it is also possible to adapt the other mechanical linking means in a manner adapted to contribute to definition of the real geometric arrangement of the filling material 3, i.e. positioning of this means can be made thicker around the edges of the geometric figures within which the filling material 3 must be confined.

In accordance with the present invention, the through seaming lines 5 can be conveniently made along the perimeter of the primary continuous layer 2a and the secondary continuous layer 2b or over the whole surface of the continuous layers, depending on the desired results.

Due to these through seaming lines, steadiness of position of the filling material 3 within the continuous layers 2a and 2b is simultaneously ensured, as well as bonding of the two continuous layers and structural cooperation of the seaming lines 5. In particular, the seaming lines 5 pass through the filling material 3 for the purpose not only of linking layers 2a and 2b, but also of acting as locking elements to sliding of the different particles forming the filling material 3.

According to another advantageous alternative embodiment of the process of the invention, an operating step is also provided which consists in associating at least one continuous stiffening layer 2c which will be able to have all possible construction embodiments already described as regards nature of the primary and secondary continuous layers 2a, 2b; in particular, the stiffening layer 2c can be made of reinforcing fibres, the nature and mutual arrangement of which substantially correspond to all possible embodiments already described for the continuous layers 2a and 2b. Addition of this stiffening layer 2c can be accomplished by linking the latter to either of the two continuous layers 2a or 2b, or even to both of them, depending on the mechanical capacities to be given to the manufactured item 1; obviously, if required, the stiffening layer can be associated with the primary continuous layer 2a alone.

In short, the above described process enables achievement of a manufactured item consisting of a primary continuous layer 2a (substantially in the form of a sheet element of a netlike structure having mesh sizes smaller than the average sizes of the particles defining the filling material 3) and a predetermined amount of filling material 3 associated with the primary continuous layer 2a through a plurality of mechanical linking elements (typically the seaming lines 5).

In accordance with the invention, the filling material 3 is associated with the primary continuous layer 2a according to a predetermined geometric arrangement over the primary continuous layer 2a itself, and in particular according to any combination of filling lines 6a, 6b, discrete filling areas 6c and/or filling routes 6d.

Suitably, the manufactured item 1 can have a secondary continuous layer 2b disposed close to the primary continuous layer 2a so that the filling material 3 is sandwiched between the two layers 2a and 2b. In addition, the manufactured item may comprise one or more stiffening layers 2c associated with either or both of the primary and secondary continuous layers 2a, 2b.

In accordance with the present invention, layers 2a, 2b and 2c substantially are sheet elements, made of polymeric material and/or reinforcing fibres, the nature and arrangement of which correspond to the above description.

Advantageously, it is also part of the present invention an industrial apparatus for putting into practice the process for producing the manufactured item 1 made of an at least partly recycled material in accordance with the present invention.

The manufactured item of a reinforcing fibre with a sheet-like structure, which is obtained with the process of the present invention can be advantageously employed in different applications, in making section members preferably obtained by pultrusion, for example. In this production process the following steps take place in succession: producing the manufactured item 1 with the above described process of the invention, impregnating the sheet-like manufactured item thus obtained with a binding substance, forming the section of the section member by forced passage through a cavity of pre-established shape (or an extruder through which partial or complete polymerisation of the resin takes place) and finally executing possible transverse cuts on the section member coming out of the moulding extruder so as to obtain finished articles of the desired length. The article obtained from this production process substantially is a section member of composite material, the portion of which adapted to resist mechanical stresses comprises the sheet-like manufactured item obtained with the process of the present invention. The core of the sheet-like manufactured item in which the filling material is stably positioned during the moulding step of the section member occupies parts of the section thereof that are not submitted to important stresses during use; on the contrary, the continuous layers 2a and 2b external to the tilling material 2 can be advantageously disposed where important efforts are expected to occur, in particular tensile stresses. Due to the possibility of managing positioning of the tilling material 2 in a precise manner, there is a saving in terms both of added fibres and added binding resin without any decay of the mechanical properties of the section member.

The manufactured item of reinforcing fibre, in particular in the embodiment involving the presence of more than one continuous layer of reinforcing fibre, advantageously finds application in the construction of support posts of tubular structure. These posts are manufactured by a production process comprising the following essential steps: arranging a plurality of manufactured items of reinforcing fibre and produced with the process of the invention and of different lengths; winding the sheet-like supports around a mandrel; introducing the mandrel holding the manufactured items into a rotating chamber and finally impregnating the sheet-like supports with a binding substance by centrifugation. Using this production process, posts of varying section are obtained, in particular tapering posts. Along the longitudinal axis of the post the manufactured items are such arranged that one of the two continuous layers of reinforcing fibre of each manufactured item is turned inwardly (i.e. towards the cylindrical cavity of the tubular post) and the other continuous layer is turned outwardly. The two continuous layers enclose the filling material. In this way the continuous layers withstand the mechanical stresses, whereas the filling material stabilizes the laminate improving behaviour of same towards flexion and compression loads.

More generally, due to the structure of the concerned manufactured item, finished or semi-finished products can be made in which the filling material is confined to regions of the product where weak mechanical stresses, in particular tensile stresses are present. At the same time, the filling material gives the section important properties such as a high moment of inertia; in the case of the above mentioned posts the filling material 2 is substantially positioned at an annulus disposed in an intermediate region of the post section, between the inner wall and outer wall of the post itself.

The invention achieves important advantages.

In fact, the intrinsic simplicity of the process enables the plants to have a high productivity due to the high operating speed in carrying out the described operations.

In addition, the process enables manufacture of an item mostly made up of recycled material, which will bring about an important recovery of discarded articles for which disposal would be difficult, thereby reducing the environmental impact.

Another important advantage is given by the fact that the manufactured item obtained with the present process can have very differentiated sizes with different surfaces and thicknesses, which will bring about important benefits in terms of adaptability to a wide variety of applications.

First of all, since the crushed material used in recycling is linked to the mechanically resistant sheet-like layer, precise determination of the recycling material position can be really ensured; in particular, since addition of the binding resin takes place after the step of mechanically linking the material intended for recycling to the support layer, distribution of the recycled material is perfectly known and this material cannot be submitted to displacements by interaction with the fluid resin or for any other undesired mechanical action.

Another advantage resulting from applying this process to production of a manufactured article made of glass fibre resides in that the fibre lengths present in the recycling material are mechanically linked to the glass fibres really working in the manufactured item, which will improve resistance to mechanical stresses.

Advantageously, use of material from crushing is also useful when volume occupation is necessary, for instance in structural elements that must be provided with excellent stability to compression stresses, since in this way big spaces can be filled without use of new resistant fibres where too strong efforts (in particular tensile stresses) are not required. Therefore, in this case there is an important reduction in the used-material costs above all by introducing materials otherwise unusable into the production cycle.

Finally, the filling material 3 suitably positioned enables the moment of inertia of the sections of the products in which it is used (section members, posts and the like) to be increased, thereby promoting efficiency of the working portions (new fibres) of the finished composite article.

Finally, the process of the invention reduces the production costs and greatly simplifies the manufacturing processes, since the employed materials are relatively cheap and the dedicated plants are of simple construction and operation.

What is claimed is:

1. A process for producing a manufactured item made of an at least partly recycled material, comprising the following steps:

setting a primary continuous layer (2a);

setting a filling material (3);

wherein said process also comprises at least the further steps of:

providing a filling material (3) by previously crushing operations carried out on manufactured articles of composite material, said filling material (3) being made from an at least partly recycled material and comprising resin and fibre powder, agglomerates of broken fibres and resin, lengths of isolated fibres and heterogenous resin clots;

associating a predetermined amount of filling material (3) with said primary continuous layer (2a); and mechanically linking the filling material (3) to the primary continuous layer (2a) to define the manufactured item (1).

2. The process as claimed in claim 1, wherein the step of associating the filling material (3) with the primary continuous layer (2a) comprises at least one sub-step of positioning the filling material (3) on the primary continuous layer (2a) following a predetermined geometric arrangement.

3. The process as claimed in claim 1 or 2, wherein the step of setting the primary continuous layer (2a) takes place by causing the primary continuous layer (2a) to move forward along a first operating direction (4).

4. The process as claimed in claim 3, wherein the sub-step of positioning the filling material (3) takes place through deposition of the filling material (3) over the whole surface of the primary continuous layer (2a).

5. The process as claimed in claim 3, wherein the sub-step of positioning the filling material (3) takes place by deposition of the filling material (3) on the primary continuous layer (2a) according to a predetermined number of continuous or broken longitudinal filling lines (6a), substantially parallel to said first operating direction (4) and spaced apart the same distance from each other.

6. The process as claimed in claim 3, wherein the sub-step of positioning the filling material (3) takes place by deposition of the filling material (3) on the primary continuous layer (2a) according to a predetermined number of continuous or broken transverse filling lines (6b) perpendicular to said first operating direction (4) and spaced apart the same distance from each other.

7. The process as claimed in claim 3, wherein the sub-step of positioning the filling material (3) takes place by deposition of the filling material (3) on the primary continuous layer (2a) according to a predetermined arrangement of discrete filling areas (6c).

8. The process as claimed in claim 3, wherein the sub-step of positioning the filling material (3) takes place by deposition of the filling material (3) on the primary continuous layer (2a) according to a predetermined arrangement of filling routes (6d), said filling routes (6d) comprising a plurality of curved portions.

9. The process as claimed in claim 1, wherein the sub-step of positioning the filling material (3) is embodied by a predetermined combination of longitudinal filling lines (6a) and/or transverse filling lines (6b) and/or discrete filling areas (6c) and/or filling routes (6d).

10. The process as claimed in claim 1, further comprising a step of adjusting a deposition height of the filling material (3) associated with the primary continuous layer (2a).

11. The process as claimed in claim 10, wherein the step of adjusting said deposition height takes place by control of a feeding speed of the primary continuous layer (2a) along the first operating direction.

12. The process as claimed in claim 10, wherein the step of adjusting the deposition height takes place by control of a dropping speed and/or flow rate of the filling material (3) on the primary continuous layer (2a).

13. The process as claimed in claim 10, wherein the step of adjusting the deposition height takes place by interaction of a height-adjusting member (7) with the filling material (3), said height-adjusting member (7) being operatively active on the filling material (3) laid down on the primary continuous layer (2a) to determine a maximum thickness of same.

14. The process as claimed in claim 10, wherein the step of adjusting the deposition height of the filling material (3) takes place simultaneously with the step of associating the filling material (3) with the primary continuous layer (2a).

15. The process as claimed in claim 1, wherein the primary continuous layer (2a) has a netlike structure having mesh sizes smaller than the average sizes of the particles defining the filling material (3).

16. The process as claimed in claim 1, wherein the step of mechanically linking the primary continuous layer (2a) to the filling material (3) takes place by means of seaming lines (5) and/or thread lengths and/or rope lengths, and/or glueing.

17. The process as claimed in claim 1, further comprising a step of setting at least one secondary continuous layer (2b) close to the primary continuous layer (2a) and along the first operating direction (4).

18. The process as claimed in claim 17, further comprising a step of moving the secondary continuous layer (2b) close to the primary continuous layer (2a), the filling material (3) being at least partly confined between said secondary continuous layer (2b) and the primary continuous layer (2a).

19. A process as claimed in claim 17, wherein said step of setting said secondary continuous layer (2b) takes place after the step of associating the filling material (3) with the primary continuous layer (2a).

20. The process as claimed in claim 17, further comprising a step of mechanically linking the primary continuous layer (2a) and the secondary continuous layer (2b) to the filling material (3), said filling material (3) being disposed between the primary continuous layer (2a) and secondary continuous layer (2b).

21. The process as claimed in claim 20, wherein the step of mechanically linking the primary continuous layer (2a) and the secondary continuous layer (2b) to the filling material (3) is embodied by through seaming lines (5a) and/or glueing, and/or rope lengths, and/or thread lengths and/or heat-sealing.

22. The process as claimed in claim 1, wherein the filling material (3) is obtained from previous crushing operations carried out on manufactured articles of composite material of the thermosetting type.

23. The process as claimed in claim 22, wherein said crushing operations comprise at least one step of grinding manufactured articles of composite material of the thermosetting type.

24. The process as claimed in claim 1 or in claim 17, wherein the step of setting the primary continuous layer (2a) and/or the step of setting the secondary continuous layer (2b) takes place by unrolling a source roll (8) along the first operating direction (4), each of the primary and secondary continuous layers (2a, 2b) being unrolled from a respective source roll (8).

25. The process as claimed in claim 24, wherein the step of setting the secondary continuous layer (2b) takes place after the step of setting the primary continuous layer (2a) and after the step of adjusting the deposition height of the filling material (3).

26. The process as claimed in claim 1 or in claim 17, further comprising a step of associating at least one stiffening continuous layer (2c) with the primary continuous layer (2a) and/or the secondary continuous layer (2b).

27. The process as claimed in claim 26, wherein the primary continuous layer (2a) and the secondary continuous layer (2b) and the stiffening layer (2c) comprise at least one sheet element of polymeric material of the thermoplastic type, and a plurality of reinforcing fibres organized to form a fabric or a nonwoven fabric or a paper structure or a plurality of yarns disposed in parallel side by side relationship.

28. A process for producing a manufactured item made of an at least partly recycled material, comprising the following steps:
  setting a primary continuous layer (2a);
  setting a filling material (3);
  wherein said process also comprises at least the further steps of:
    recycling a composite material item for providing a filling material (3) which is made from an at least partially recycled material, said filling material (3) being of heterogeneous nature;
    associating a predetermined amount of filling material (3) with said primary continuous layer (2a); and
    mechanically linking the filling material (3) to the primary continuous layer (2a) to define the manufactured item (1).

* * * * *